United States Patent
Yoo et al.

(10) Patent No.: US 10,686,185 B2
(45) Date of Patent: *Jun. 16, 2020

(54) CARBON NANOTUBE DISPERSION LIQUID AND MANUFACTURING METHOD THEREOF

(71) Applicant: LG CHEM, LTD., Seoul (KR)

(72) Inventors: Houngsik Yoo, Daejeon (KR); Jong Won Lee, Daejeon (KR); Dong Hyun Kim, Daejeon (KR); Gyemin Kwon, Daejeon (KR); Byoung Hoon Ahn, Daejeon (KR); Yelin Kim, Daejeon (KR); Sang Hoon Choy, Daejeon (KR); Hyeon Choi, Daejeon (KR); Jungkeun Yoo, Daejeon (KR)

(73) Assignee: LG CHEM, LTD., Seoul (KR)

(*) Notice: Subject to any disclaimer, the term of this patent is extended or adjusted under 35 U.S.C. 154(b) by 160 days.

This patent is subject to a terminal disclaimer.

(21) Appl. No.: 15/760,066

(22) PCT Filed: Aug. 26, 2016

(86) PCT No.: PCT/KR2016/009553
§ 371 (c)(1),
(2) Date: Mar. 14, 2018

(87) PCT Pub. No.: WO2017/052087
PCT Pub. Date: Mar. 30, 2017

(65) Prior Publication Data
US 2019/0051887 A1    Feb. 14, 2019

(30) Foreign Application Priority Data

Sep. 25, 2015 (KR) .................. 10-2015-0137106

(51) Int. Cl.
| | | |
|---|---|---|
| *H01M 4/139* | (2010.01) | |
| *H01M 4/04* | (2006.01) | |
| *H01M 4/62* | (2006.01) | |
| *C01B 32/174* | (2017.01) | |
| *H01M 10/0525* | (2010.01) | |

(52) U.S. Cl.
CPC .......... *H01M 4/139* (2013.01); *C01B 32/174* (2017.08); *H01M 4/0404* (2013.01); *H01M 4/62* (2013.01); *H01M 4/625* (2013.01); *H01M 10/0525* (2013.01)

(58) Field of Classification Search
None
See application file for complete search history.

(56) References Cited

U.S. PATENT DOCUMENTS

| | | |
|---|---|---|
| 2012/0322660 A1 | 12/2012 | Beghyn et al. |
| 2013/0261246 A1 | 10/2013 | Ong et al. |
| 2015/0368108 A1* | 12/2015 | Sone ............... H01B 1/24 252/510 |

FOREIGN PATENT DOCUMENTS

| | | |
|---|---|---|
| EP | 2988351 A1 | 2/2016 |
| EP | 33485852 A1 | 7/2018 |
| JP | 2005-075661 A | 3/2005 |
| JP | 2005-162578 A | 6/2005 |
| JP | 2011-070908 A | 4/2011 |
| JP | 2014-156385 A | 8/2014 |
| JP | 2014-203804 A | 10/2014 |
| JP | 2015-026595 A | 2/2015 |
| JP | 2015-133302 A | 7/2015 |
| KR | 10-2012-0071522 A | 7/2012 |
| KR | 10-2013-0132550 A | 12/2013 |
| KR | 10-2014-0105439 A | 9/2014 |
| KR | 10-2015-0016852 A | 2/2015 |

OTHER PUBLICATIONS

Office Action of Japanese Patent Office in Appl'n No. 2018-512190, dated Nov. 28, 2019.
International Search Report from PCT/KR2016/009553, dated Dec. 6, 2016.
Written Opinion of the ISA from PCT/KR2016/009553, dated Dec. 6, 2016.

* cited by examiner

*Primary Examiner* — Maria Laios
(74) *Attorney, Agent, or Firm* — Dentons US LLP

(57) ABSTRACT

The present disclosure relates to a carbon nanotube dispersion including entangled-type carbon nanotubes, a dispersion medium, and partially hydrogenated nitrile rubber having a residual double bond (RDB) value of 0.5% by weight to 40% by weight calculated according to the following Mathematical Formula 1, wherein dispersed particle diameters of the carbon nanotubes have particle size distribution $D_{50}$ of 2 µm to 5 µm, a method for preparing the same, and methods for preparing electrode slurry and an electrode using the same.

11 Claims, No Drawings

CARBON NANOTUBE DISPERSION LIQUID AND MANUFACTURING METHOD THEREOF

TECHNICAL FIELD

This application is a National Stage Entry of International Application No. PCT/KR2016/009553 filed on Aug. 26, 2016, and claims the benefit of Korean Application No. 10-2015-0137106, filed on Sep. 25, 2015, all of which are hereby incorporated by reference in their entirety for all purposes as if fully set forth herein.

The present disclosure relates to a carbon nanotube dispersion liquid in which carbon nanotubes are uniformly dispersed into a dispersion medium, a method for preparing the same, and methods for preparing electrode slurry and an electrode using the same.

BACKGROUND ART

Fine carbon materials such as carbon black, ketjen black, fullerene, graphene and carbon nanotubes have been widely used in fields such as electronics and energy fields due to their electrical properties and thermal conductivity. Particularly, carbon nanotubes, one type of fine carbon fibers, are tube-type carbon having a thickness of 1 μm or less diameter, and are expected to be used and commercialized in various fields due to their high conductivity, tensile strength and thermal resistance caused from their unique structures.

However, despite such usefulness of carbon nanotubes, carbon nanotubes have limits in the use due to low solubility and dispersibility. In other words, carbon nanotubes have a problem in that they do not form a stably dispersed state and cause aggregation in an aqueous solution due to strong Van der Waals interaction between them.

In view of such a problem, various attempts have been made. Specifically, methods of dispersing carbon nanotubes into a dispersion medium through mechanical dispersion treatment such as ultrasonic treatment have been proposed. However, these methods have a problem in that, although dispersibility is excellent while irradiating ultrasonic waves, carbon nanotubes start to aggregate when ultrasonic irradiation is finished and aggregate when the concentration of the carbon nanotubes increases.

In addition, methods of dispersing and stabilizing carbon nanotubes using various dispersants have been proposed. For example, methods of dispersing carbon nanotubes through ultrasonic treatment for the carbon nanotubes in water or N-methyl-2-pyrrolidone (hereinafter, NMP) using an anionic surfactant such as sodium dodecyl sulfonate or sodium dodecyl benzenesulfonate, or a nonionic surfactant such as Triton (registered trademark)-X-100 have been proposed. In addition, methods of dispersing carbon nanotubes into a dispersion medium such as water or NMP using a polymer-based dispersant such as polyvinyl pyrrolidone (hereinafter, PVP) or a cellulose derivative, a water-soluble polymer, instead of a surfactant have been proposed. However, these methods also have a problem in that handling becomes difficult when fine carbon fibers are dispersed into a dispersion medium in a high concentration due to an increase in the viscosity.

Accordingly, in order to expand carbon nanotube application, preparing a dispersion liquid in which carbon nanotubes are uniformly dispersed into a dispersion medium is important.

DISCLOSURE

Technical Problem

The present disclosure is directed to providing a carbon nanotube dispersion liquid in which carbon nanotubes are uniformly dispersed into a dispersion medium, a method for preparing the same, and methods for preparing electrode slurry and an electrode using the same.

Technical Solution

One embodiment of the present application provides a carbon nanotube dispersion liquid comprising entangled-type carbon nanotubes, a dispersion medium, and partially hydrogenated nitrile rubber having a residual double bond (RDB) value of 0.5% by weight to 40% by weight calculated according to the following Mathematical Formula 1, wherein dispersed particle diameters of the carbon nanotubes have particle size distribution $D_{50}$ of 2 μm to 5 μm.

$$RDB(\% \text{ by weight}) = BD \text{ weight}/(BD \text{ weight} + HBD \text{ weight}) \times 100 \quad \text{[Mathematical Formula 1]}$$

In Mathematical Formula 1, BD means a conjugated diene-derived structure unit and HBD means a hydrogenated conjugated diene-derived structure unit.

The carbon nanotube dispersion liquid according to embodiments described in the present specification is a solution dispersing carbon nanotubes, and, together with a dispersion medium and carbon nanotubes, comprises partially hydrogenated nitrile rubber having a residual double bond value in a specific range as a main component so as to disperse the carbon nanotubes. In electrode slurry stage comprising an electrode active material, carbon nanotubes may not be efficiently dispersed. The embodiment relates to a dispersion separately dispersing carbon nanotubes before mixing the carbon nanotubes to electrode slurry, and components included in this dispersion, particularly, partially hydrogenated nitrile rubber, are distinguished from components included in the electrode slurry.

According to another embodiment of the present application, the partially hydrogenated nitrile rubber comprises an α,β-unsaturated nitrile-derived structure unit, a conjugated diene-derived structure unit and a hydrogenated conjugated diene-derived structure unit. Herein, the α,β-unsaturated nitrile-derived structure unit may be included in 20% by weight to 50% by weight with respect to the total weight of the rubber.

According to another embodiment of the present application, the carbon nanotube dispersion liquid comprises a carbon nanotube complex in which the partially hydrogenated nitrile rubber is introduced to surfaces of the carbon nanotubes. In the complex, the partially hydrogenated nitrile rubber may be present in a coated form on at least a part of the carbon nanotube surfaces.

According to another embodiment of the present application, the dispersed particle diameters of the entangled-type carbon nanotubes have particle size distribution such that $D_{50}$ is from 2 μm to 5 μm, $D_{10}$ is from 0.5 μm to 1.5 μm and $D_{90}$ is from 6 μm to 10 μm. Herein, particle size distribution $D_{50}$ may be defined as a particle size at a 50% base in the particle size distribution. In addition, the dispersed particle diameters of the carbon nanotubes may be measured using a laser diffraction method. More specifically, the dispersion liquid in which the carbon nanotubes are dispersed is introduced to a commercially available laser diffraction particle size measuring device (for example, Malvern MS300) to calculate an average particle diameter at a 50% base ($D_{50}$) in the particle size distribution. $D_{10}$ and $D_{90}$ mean particle sizes at 10% and 90%, respectively, in the particle size distribution.

Another embodiment of the present application provides a method for preparing a carbon nanotube dispersion liquid comprising mixing entangled-type carbon nanotubes, a dispersion medium and partially hydrogenated nitrile rubber having a residual double bond (RDB) value of 0.5% by weight to 40% by weight calculated according to Mathematical Formula 1.

Another embodiment of the present application provides a method for preparing a carbon nanotube dispersion liquid comprising preparing carbon nanotube slurry by mixing entangled-type carbon nanotubes and a dispersion medium; and mixing partially hydrogenated nitrile rubber having a residual double bond (RDB) value of 0.5% by weight to 40% by weight calculated according to Mathematical Formula 1 to the carbon nanotube slurry.

Another embodiment of the present application provides a method for preparing electrode slurry comprising mixing the carbon nanotube dispersion liquid, an electrode active material and a binder resin.

Another embodiment of the present application provides a method for preparing an electrode comprising preparing electrode slurry by mixing the carbon nanotube dispersion liquid, an electrode active material and a binder resin; and forming an electrode using the electrode slurry.

Another embodiment of the present application provides electrode slurry comprising the carbon nanotube dispersion liquid, an electrode active material and a binder resin.

Another embodiment of the present application provides an electrode prepared using electrode slurry comprising the carbon nanotube dispersion liquid, an electrode active material and a binder resin, and a secondary battery comprising this electrode. The electrode being prepared using electrode slurry means comprising the electrode slurry, dry matters thereof or cured matters thereof.

Advantageous Effects

In a carbon nanotube dispersion liquid according to embodiments of the present application, carbon nanotubes can be uniformly dispersed into a dispersion medium by using partially hydrogenated nitrile-based rubber controlling a content of a structure unit region capable of interacting with carbon nanotubes forming a dispersant and a content of a structure unit region capable of interacting with a dispersion medium, and in addition thereto, carbon nanotubes can be dispersed and included in a high concentration without concern over an increase in the dispersion viscosity.

MODE FOR DISCLOSURE

Hereinafter, the present disclosure will be described in more detail in order to illuminate the present disclosure.

Terms or words used in the present specification and the claims are not to be interpreted limitedly to common or dictionary meanings, and shall be interpreted as meanings and concepts corresponding to technological ideas of the present disclosure based on a principle in which inventors may suitably define the concepts of terms in order to describe their own invention in the best possible way.

A carbon nanotube dispersion according to one embodiment of the present application comprises entangled-type carbon nanotubes, a dispersion medium, and partially hydrogenated nitrile rubber having a residual double bond (RDB) value of 0.5% by weight to 40% by weight calculated according to the following Mathematical Formula 1:

RDB(% by weight)=BD weight/(BD weight+HBD weight)×100 [Mathematical Formula 1]

In Mathematical Formula 1, BD means a conjugated diene-derived structure unit and HBD means a hydrogenated conjugated diene-derived structure unit.

Partially hydrogenated nitrile rubber having a residual double bond (RDB) value of 0.5% by weight to 40% by weight calculated according to the following Mathematical Formula 1 has a structure comprising a structure unit region (A) capable of interacting with entangled-type carbon nanotubes and a structure unit region (B) capable of interacting with a dispersion medium. Accordingly, when preparing the carbon nanotube dispersion liquid using a dispersant, the carbon nanotubes is dispersed into the dispersion medium in a complex form physically or chemically binding to the structure unit region (A) of the nitrile rubber capable of interacting with the carbon nanotubes. When the nitrile rubber has a residual double bond (RDB) value of 0.5% by weight to 40% by weight calculated according to the following Mathematical Formula 1, miscibility for the dispersion medium increases leading to an increase in the carbon nanotube dispersibility. Particularly, when the residual double bond (RDB) value calculated according to Mathematical Formula 1 is 0.5% by weight or greater, binding with the carbon nanotube surfaces becomes advantageous through n-n bonds between the carbon nanotubes and the partially hydrogenated nitrile rubber, and a dispersion time may be reduced when preparing the dispersion since the carbon nanotubes are favorably wetted. In addition, partially hydrogenated nitrile rubber having a residual double bond (RDB) value of 0.5% by weight or greater is readily prepared compared to partially hydrogenated nitrile rubber having a residual double bond (RDB) value of greater than 0% by weight and less than 0.5% by weight. Furthermore, the residual double bond (RDB) value being 40% by weight or less is advantageous in terms of solubility of the partially hydrogenated nitrile rubber for the dispersion medium. The residual double bond (RDB) value may be identified by measuring a supernatant with NMR after centrifuge in the dispersion liquid. According to one embodiment, the RDB value of the nitrile rubber represented by Mathematical Formula 1 is from 0.5% by weight to 35% by weight. According to one preferred embodiment, the RDB value of the nitrile rubber represented by Mathematical Formula 1 is from 0.5% by weight to 20% by weight.

In the present disclosure, entangled-type carbon nanotubes are used as the carbon nanotubes. According to the embodiments described above, the entangled-type carbon nanotubes are uniformed dispersed into the dispersion medium by using the partially hydrogenated nitrile-based rubber controlling a content of a structure unit region capable of interacting with the entangled-type carbon nanotubes and a content of a structure unit region capable of interacting with the dispersion medium, and furthermore, a carbon nanotube dispersion liquid exhibiting low viscosity even when dispersing highly concentrated entangled-type carbon nanotubes may be provided. According to another embodiment of the present application, the carbon nanotube dispersion liquid comprises a carbon nanotube complex in which the partially hydrogenated nitrile rubber is introduced to surfaces of the carbon nanotubes. In the complex, the partially hydrogenated nitrile rubber may be present in a coated form on at least a part of the carbon nanotube surfaces.

The dispersed particle diameters of the entangled-type carbon nanotubes have particle size distribution such that $D_{50}$ is from 2 μm to 5 μm and more specifically from 3 μm to 5 μm, $D_{10}$ is from 0.5 μm to 1.5 μm and more specifically from 0.9 μm to 1.3 μm, and $D_{90}$ is from 6 μm to 10 μm and more specifically from 7.5 μm to 10 μm. Herein, the dispersed particle diameters of the carbon nanotubes mean particle diameters of secondary particles formed by first particles of the carbon nanotubes being aggregated with each other. Such dispersed particle diameters may be measured using a laser diffraction particle size analysis method.

According to another embodiment of the present application, the carbon nanotube dispersion liquid may have viscosity of 1 Pa·s to 120 Pa·s, specifically 30 Pa·s to 110 Pa·s, and more specifically 30 Pa·s to 95 Pa·s. Viscosity of the dispersion may be measured using a Haake rheometer, and specifically, the viscosity may be measured at a shear of 1.2/s.

According to one embodiment, in the dispersion liquid, the entangled-type carbon nanotubes may be included in 1% by weight to 10% by weight and more specifically in 1% by weight to 5% by weight based on the whole dispersion liquid (100% by weight), and the partially hydrogenated nitrile rubber may be included in 10 parts by weight to 50 parts by weight, specifically in 10 parts by weight to 40 parts by weight and more specifically in 20 parts by weight to 30 parts by weight with respect to 100 parts by weight of the entangled-type carbon nanotubes. When the carbon nanotube content is 1% by weight or greater, slurry solid occupies over a certain level when preparing the electrode slurry, which is advantageous for electrode coating. Increasing the carbon nanotube content is advantageous in terms of processability, however, the carbon nanotube content being 10% by weight or less prevents dispersion liquid viscosity from rising too high facilitating the preparation into a disperser.

According to another embodiment of the present application, the partially hydrogenated nitrile rubber comprises an α,β-unsaturated nitrile-derived structure unit, a conjugated diene-derived structure unit and a hydrogenated conjugated diene-derived structure unit. The nitrile rubber comprises the α,β-unsaturated nitrile-derived structure unit as a structure unit region (A) capable of interacting with the carbon nanotubes; the conjugated diene-derived structure unit and the hydrogenated conjugated diene-derived structure unit as a structure unit region (B) capable of interacting with the dispersion medium. Herein, the partially hydrogenated nitrile rubber may selectively further comprise an additional co-monomer copolymerizable under a condition that the carbon nanotube complex in which the partially hydrogenated nitrile rubber is introduced to the surface has the above-mentioned particle size distribution.

The partially hydrogenated nitrile rubber may be prepared by copolymerizing α,β-unsaturated nitrile, conjugated diene and, selectively, other copolymerizable co-monomers, and then hydrogenating C=C double bonds in the copolymer. Herein, the polymerization reaction process and the hydrogenation process may be carried out using common methods.

Specific examples of the α,β-unsaturated nitrile capable of being used when preparing the partially hydrogenated nitrile rubber may comprise acrylonitrile, methacrylonitrile or the like, and among these, one type alone or a mixture of two or more types may be used.

Specific examples of the conjugated diene capable of being used when preparing the partially hydrogenated nitrile rubber may comprise conjugated diene having 4 to 6 carbon atoms such as 1,3-butadiene, isoprene or 2,3-methylbutadiene, and any one or a mixture of two or more thereof may be used.

In addition, specific examples of the other copolymerizable co-monomers capable of being selectively used may include aromatic vinyl monomers (for example, styrene, α-methylstyrene, vinylpyridine, fluoroethyl vinyl ether or the like), α,β-unsaturated carboxylic acids (for example, acrylic acid, methacrylic acid, maleic acid, fumaric acid or the like), esters or amides of α,β-unsaturated carboxylic acids (for example, methyl (meth)acrylate, ethyl (meth) acrylate, n-dodecyl (meth) acrylate, methoxymethyl (meth) acrylate, hydroxyethyl (meth)acrylate, polyethylene glycol (meth)acrylate or the like), anhydrides of α,β-unsaturated dicarboxylic acids (for example, maleic anhydride, itaconic anhydride, citraconic anhydride or the like), but are not limited thereto.

According to one embodiment, the partially hydrogenated nitrile rubber further comprises an ester of an α,β-unsaturated carboxylic acid, for example, a (meth)acrylate-based monomer as the co-monomer. Examples of the (meth) acrylate-based monomer include methyl acrylate, ethyl acrylate, propyl acrylate, isopropyl acrylate, n-butyl acrylate, isobutyl acrylate, n-amyl acrylate, isoamyl acrylate, n-ethylhexyl acrylate, 2-ethylhexyl acrylate, 2-hydroxyethyl acrylate, methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, n-ethylhexyl methacrylate, 2-ethylhexyl methacrylate, 2-hydroxyethyl methacrylate, hydroxypropyl methacrylate and the like.

In the partially hydrogenated nitrile rubber prepared using a method such as above, a content ratio of the α,β-unsaturated nitrile-derived structure unit, the conjugated diene-derived structure unit, the hydrogenated conjugated diene-derived structure unit and, selectively, the other copolymerizable co-monomer-derived structure unit may vary in a wide range, and in each case, the total sum of the structure units becomes 100% by weight.

Specifically, when considering dispersibility enhancement for the carbon nanotubes and miscibility with the dispersion medium, the content of the α,β-unsaturated nitrile-derived structure unit in the partially hydrogenated nitrile rubber may be from 20% by weight to 50% by weight and specifically from 20% by weight to 45% by weight with respect to the total weight of the partially hydrogenated nitrile rubber. When comprising the α,β-unsaturated nitrile structure-containing repeating unit in the above-mentioned content range, dispersibility of the carbon nanotubes may increase and high conductivity may be provided even when the added amount of the carbon nanotubes is small.

In the present disclosure, the nitrile structure-containing repeating unit in the partially hydrogenated nitrile rubber is a weight ratio of the structure unit derived from the α,β-unsaturated nitrile with respect to the whole rubber, and the corresponding content is a median value obtained by measuring the produced nitrogen amount in accordance with a mill oven method of JIS K 6364, converting the amount of binding amount thereof from the acrylonitrile molecular weight, and quantizing.

In addition, when further comprising the other copolymerizable co-monomers, the content ratio may vary depending on the type and the properties of the co-monomer, and specifically, the content of the co-monomer-derived structure unit may be 40% by weight or less and more specifically from 20% by weight to 40% by weight with respect to the total weight of the partially hydrogenated nitrile-based rubber. In this case, the conjugated diene and/or the α,β-unsaturated nitrile of the corresponding ratios are substituted with additional monomers with such ratios, and herein, the ratios of all the monomers become 100% by weight in each case.

According to one embodiment, the partially hydrogenated nitrile rubber comprises a unit of the following Chemical Formula 1, a unit of the following Chemical Formula 2 and a unit of the following Chemical Formula 3.

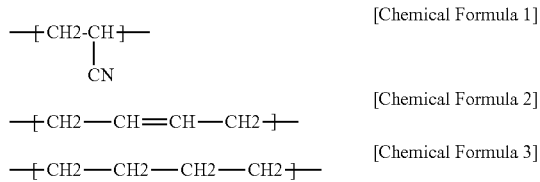

Herein, the content of the acrylonitrile-derived structure unit represented by Chemical Formula 1 may be, for example, from 20% by weight to 50% by weight and specifically from 20% by weight to 45% by weight with respect to the total weight of the rubber.

The content of the unit represented by Chemical Formula 2 is from 0.1% by weight to 30% by weight and more specifically from 0.1% by weight to 25% by weight with respect to the total weight of the rubber.

The content of the unit represented by Chemical Formula 3 is from 20% by weight to 70% by weight, specifically from 30% by weight to 70% by weight, and more specifically from 40% by weight to 70% by weight with respect to the total weight of the rubber.

According to one embodiment, the partially hydrogenated nitrile rubber may have a weight average molecular weight of 10,000 g/mol to 700,000 g/mol and more specifically 100,000 g/mol to 600,000 g/mol. In addition, the partially hydrogenated nitrile rubber may have a polydispersity index PDI (ratio of Mw/Mn, Mw is a weight average molecular weight and Mn is a number average molecular weight) in a range of 2 to 6 and preferably in a range of 2 to 5. When the nitrile rubber has a weight average molecular weight and a polydispersity index in the above-mentioned ranges, the carbon nanotubes may be uniformly dispersed into the dispersion medium. In the present disclosure, the weight average molecular weight and the number average molecular weight are a polystyrene conversion molecular weight analyzed by gel permeation chromatography (GPC). The molecular weight being less than a certain level prevents dispersion liquid viscosity from rising too high, which is advantageous in terms of processability when preparing the dispersion liquid using a disperser.

In addition, the partially hydrogenated nitrile rubber may have Mooney viscosity (ML 1+4 at 100° C.) of 10 to 120 and more specifically 10 to 100. In the present disclosure, Mooney viscosity of the partially hydrogenated nitrile rubber may be measured in accordance with ASTM standard D 1646. High Mooney viscosity is considered to have a high molecular weight.

The entangled-type refers to a secondary form having a sphere or potato shape in which a plurality of carbon nanotubes are entangled without directivity. According to one embodiment, the entangled-type carbon nanotubes have diameters of 10 nm to 30 nm. The diameters of the carbon nanotubes may be measured through SEM. As a reference, a bundle-type refers to a secondary form having a bundle or rope shape in which a plurality of carbon nanotubes are arranged or aligned side by side.

In the carbon nanotubes mentioned in the present specification, a graphite sheet has a cylinder shape with a nano-sized diameter, and has a $sp^2$ bonding structure. Herein, the carbon nanotubes exhibit properties of a conductor or a semiconductor depending on the rolled angle and structure of the graphite sheet. In addition, the carbon nanotubes may be divided into single-walled carbon nanotubes (SWCNT), double-walled carbon nanotubes (DWCNT) and multi-walled carbon nanotubes (MWCNT) depending on the number of bonds forming the wall, and these carbon nanotubes may be properly selected depending on the application of the dispersion. Specifically, the single-walled carbon nanotubes have metallic properties and semiconductor properties and thereby exhibit various electric, chemical, physical and optical properties, and therefore, may be suited when a carbon nanotube dispersion is used for an application of obtaining a minute and integrated device.

In the carbon nanotube dispersion according to one embodiment of the present disclosure, the carbon nanotubes may include any one, two or more of the single-walled, the double-walled and the multi-walled carbon nanotubes.

In addition, the entangled-type carbon nanotubes may have a BET specific surface area of 180 $m^2/g$ to 260 $m^2/g$. By having such a BET specific surface area, more superior dispersibility may be obtained when combined with the partially hydrogenated nitrile-based rubber controlling the content of the structure unit region capable of interacting with the entangled-type carbon nanotubes and the content of the structure unit region capable of interacting with the dispersion medium as above.

In the present disclosure, the specific surface area of the entangled-type carbon nanotubes is measured using a BET method, and specifically, may be calculated from a nitrogen gas adsorption amount under a liquid nitrogen temperature (77K) using BELSORP-mino II manufactured by BEL Japan.

The carbon nanotubes may be manufactured using common methods such as an arc discharge method, a laser vaporization method and a chemical vapor deposition method, and those that are commercially available may be purchased to be used.

According to one embodiment of the present application, the dispersion medium may be an organic solvent comprising any one, or two or more heteroatoms selected from the group consisting of a nitrogen atom (N) and an oxygen atom (O) having an unshared electron pair.

Specific examples of the dispersion medium may comprise amide-based polar organic solvents such as dimethylformamide (DMF), diethylformamide, dimethylacetamide (DMAc) or N-methyl pyrrolidone (NMP); alcohols such as methanol, ethanol, 1-propanol, 2-propanol (isopropyl alcohol), 1-butanol (n-butanol), 2-methyl-1-propanol (isobutanol), 2-butanol (sec-butanol), 1-methyl-2-propanol (tert-butanol), pentanol, hexanol, heptanol or octanol; glycols such as ethylene glycol, diethylene glycol, triethylene glycol, propylene glycol, 1,3-propanediol, 1,3-butanediol, 1,5-pentanediol or hexylene glycol; polyalcohols such as glycerin, trimethylolpropane, pentaerythritol or sorbitol; glycol ethers such as ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether or tetraethylene glycol monobutyl ether; ketons such as acetone, methyl ethyl ketone, methyl propyl ketone or cyclopentanone; esters such as ethyl acetate, γ-butyrolactone, or ε-propiolactone, and any one, or a mixture of two or more thereof may be used.

The content of the entangled-type carbon nanotubes, the dispersion medium and the partially hydrogenated nitrile rubber may be properly determined depending on the application of the dispersion liquid.

According to one embodiment, for uniformly dispersing the entangled-type carbon nanotubes into the dispersion liquid, the partially hydrogenated nitrile rubber may be included in 10 parts by weight to 50 parts by weight with respect to 100 parts by weight of the entangled-type carbon nanotubes. When the partially hydrogenated nitrile rubber content is less than 10 parts by weight, the carbon nanotubes is difficult to be uniformly dispersed into the dispersion liquid, and the content being greater than 50 parts by weight may cause concern of processability decline and the like due to an increase in the dispersion liquid viscosity.

According to one embodiment, the content of the whole solute comprising the entangled-type carbon nanotubes and the dispersant is from 1% by weight to 15% by weight, and the content of the dispersion medium may be from 85% by weight to 99% by weight. In addition, the content of the entangled-type carbon nanotubes is from 50% by weight to 90% by weight and the content of the partially hydrogenated nitrile rubber may be from 10% by weight to 50% by weight in the whole solute. In the above-mentioned range, the entangled-type carbon nanotubes may be uniformly dispersed into the solvent.

The carbon nanotube dispersion liquid according to the embodiments described above may be prepared using a preparation method comprising mixing entangled-type carbon nanotubes, a dispersion medium and the partially hydrogenated nitrile rubber described above. For example, the carbon nanotube dispersion liquid may be prepared by adding entangled-type carbon nanotubes to a dispersion medium in which the partially hydrogenated nitrile rubber is dissolved, adding entangled-type carbon nanotubes to a dispersion medium and then dissolving the partially hydrogenated nitrile rubber therein, or adding and mixing entangled-type carbon nanotubes and the partially hydrogenated nitrile rubber to a dispersion medium.

According to one embodiment, the carbon nanotube dispersion liquid may be prepared using a method comprising preparing carbon nanotube slurry by mixing entangled-type carbon nanotubes and a dispersion medium (Step 1); and mixing partially hydrogenated nitrile rubber having a residual double bond (RDB) value of 0.5% by weight to 40% by weight calculated according to Mathematical Formula 1 to the carbon nanotube slurry (Step 2).

Hereinafter, each step will be described in detail.

Step 1 for preparing the carbon nanotube dispersion liquid is a step of preparing carbon nanotube slurry by mixing entangled-type carbon nanotubes and a dispersion medium. Herein, types and the used amounts of the entangled-type carbon nanotubes and the dispersion medium are the same as described above.

Mixing of the entangled-type carbon nanotubes and the dispersion medium may be carried out using common mixing methods, specifically, using a mixing apparatus such as a homogenizer, a beads mill, a ball mill, a basket mill, an attrition mill, an all-round stirrer, a clear mixer or a TK mixer.

In addition, when mixing the entangled-type carbon nanotubes and the dispersion medium, a cavitation dispersion treatment may be carried out for enhancing miscibility of the entangled-type carbon nanotubes and the dispersion medium, or increasing dispersibility of the entangled-type carbon nanotubes in the dispersion medium. The cavitation dispersion treatment is a dispersion treatment method using shock waves generated by the rupture of vacuum bubbles produced in water when high energy is applied to a liquid, and the entangled-type carbon nanotubes may be dispersed using the method without damaging properties thereof. Specifically, the cavitation dispersion treatment may be carried out by an ultrasonic wave, a jet mill or a shear dispersion treatment.

The dispersion treatment process may be properly carried out depending on the amount of the entangled-type carbon nanotubes and the type of the dispersant.

Specifically, when the ultrasonic treatment is carried out, the frequency may be in a range of 10 kHz to 150 kHz, the amplitude may be in a range of 5 μm to 100 μm, and the irradiation time may be from 1 minute to 300 minutes. As an ultrasonic wave generator for carrying out the ultrasonic treatment process, an ultrasonic homogenizer and the like may be used for example. In addition, when carrying the jet mill treatment, the pressure may be from 20 MPa to 250 MPa, and the treatment may be carried out one time or more, specifically, for a plurality of times of two times or more. In addition, as the jet mill dispersion apparatus, a high pressure wet jet mill and the like may be used.

The temperature when carrying out the cavitation dispersion treatment process is not particularly limited, however, the treatment may be carried out under a temperature causing no concern over changes in the dispersion liquid viscosity caused by evaporation of the dispersion medium. Specifically, the treatment may be carried out at a temperature of 50° C. or lower and more specifically at a temperature of 15° C. to 50° C.

In addition, Step 2 for preparing the carbon nanotube dispersion liquid according to one embodiment of the present disclosure is a step of mixing the partially hydrogenated nitrile rubber to the carbon nanotube slurry prepared in Step 1. Herein, the type and the used amount of the partially hydrogenated nitrile rubber are the same as described above.

The mixing process may be carried out using common mixing or dispersion methods, and specifically, may be carried out using a milling method such as a ball mill, a bead mill or a basket mill, or using a homogenizer, a beads mill, a ball mill, a basket mill, an attrition mill, an all-round stirrer, a clear mixer or a TK mixer. More specifically, a milling method using a bead mill may be used. Herein, the size of the bead mill may be properly determined depending on the type and the amount of the carbon nanotubes, and the type of the partially hydrogenated nitrile rubber, and specifically, the diameter of the bead mill may be from 0.5 mm to 2 mm.

Using the preparation method as above, the dispersion liquid in which the entangled-type carbon nanotubes are uniformly dispersed into the dispersion medium may be prepared.

Specifically, in the carbon nanotube dispersion liquid according to embodiments of the present disclosure, the partially hydrogenated nitrile rubber is dispersed and included in a carbon nanotube-dispersant complex form by being introduced to the entangled-type carbon nanotube surfaces through physically or chemically binding on the entangled-type carbon nanotube surfaces. The dispersed particle diameters of the entangled-type carbon nanotubes have particle size distribution such that $D_{50}$ is from 2 μm to 5 μm, $D_{10}$ is from 0.5 μm to 1.5 μm and $D_{90}$ is from 6 μm to 10 μm. Accordingly, the carbon nanotube dispersion according to the present disclosure may exhibit more superior electric, thermal and mechanical properties due to uniform dispersion of the entangled-type carbon nanotubes, and workability is enhanced as well by maintaining low viscosity, and as a result, application and commercialization in various fields may be accomplished.

Another embodiment of the present application provides a method for preparing electrode slurry comprising mixing the carbon nanotube dispersion liquid, an electrode active material and a binder resin.

Another embodiment of the present application provides a method for preparing an electrode comprising preparing electrode slurry by mixing the carbon nanotube dispersion liquid, an electrode active material and a binder resin; and forming an electrode using the electrode slurry.

As the preparation methods and the materials such as an electrode active material and a binder resin of the electrode slurry and the electrode, those known in the art may be used. For example, PVDF and the like may be used as the binder resin. While the binder resin such as PVDF in the electrode slurry is used for adhering a metal thin film and an electrode active material, the partially hydrogenated nitrile rubber in the carbon nanotube dispersion liquid described above is for dispersing the entangled-type carbon nanotubes before mixing with the electrode active material. The binder resin in the electrode slurry to which an electrode active material is already added may not perform a role of dispersing the carbon nanotubes, and therefore, the binder resin in the electrode slurry and the partially hydrogenated nitrile resin in the carbon nanotube dispersion liquid are distinguished.

The forming of an electrode may be carried out by coating the slurry on a current collector, and drying or curing the result as necessary.

Another embodiment of the present application provides electrode slurry comprising the carbon black dispersion liquid, an electrode active material and a binder resin.

Another embodiment of the present application provides an electrode prepared using electrode slurry comprising the carbon black dispersion liquid, an electrode active material and a binder resin, and a secondary battery comprising this electrode. The electrode being prepared using electrode slurry means comprising the electrode slurry, dried matters thereof or cured materials thereof.

The secondary battery comprises a positive electrode, a negative electrode and an electrolyte, and at least one of the positive electrode and the negative electrode may be prepared using electrode slurry comprising the carbon black dispersion. The battery may further comprise a separator provided between the positive electrode and the negative electrode as necessary.

The secondary battery may be a lithium ion secondary battery.

Hereinafter, examples of the present disclosure will be described in detail so that those having common knowledge in the technology field to which the present disclosure belongs may readily implement the present disclosure. However, the present disclosure may be embodied in various different forms and is not limited to the examples described herein.

EXAMPLES 1 TO 8 AND COMPARATIVE EXAMPLES 1 TO 7

To an N-methylpyrrolidone (NMP) solvent, entangled-type carbon nanotubes having a monomer diameter of 10 nm to 30 nm and BET of 200 $m^2/g$, and partially hydrogenated nitrile rubber of the following Table 1 were mixed in a content as shown in the following Table 2 to prepare a carbon nanotube dispersion liquid. % by weight in Table 1 is based on 100% by weight of the partially hydrogenated nitrile rubber, and % by weight of Table 2 is based on 100% by weight of the carbon nanotube dispersion liquid. Herein, a beads mill was used. Dispersed particle diameters and viscosity of the prepared dispersion liquids were measured and shown in the following Table 3.

A weight average molecular weight of the partially hydrogenated nitrile rubber was measured using gel permeation chromatography (GPC) under the following condition. When measuring the molecular weight, DMF was used as a solvent. In the dispersion state, a molecular weight of the supernatant may be measured after centrifuge, and in electrode and battery states, the electrode was scratched and partially hydrogenated nitrile rubber was extracted using THF to measure the molecular weight.

Apparatus: Alliance 2695 manufactured by Waters
Detector: Viscotek TDA 302 RID manufactured by Malvern
Column: use two PLgel Olexis and one PLgel mixed C manufactured by Agilent
Solvent: THF
Column temperature: 40° C.
Flow rate: 1 ml/min
Sample concentration: 1 mg/mL, 100 μL injection
Standard sample: polystyrene (Mp: 3900000, 723000, 316500, 70950, 31400, 8450, 3940, 485)

As the analysis program, OmmiSEC of Malvern was used, and after obtaining a weight average molecular weight (Mw) and a number average molecular weight (Mn) using GPC, molecular weight distribution (PDI) was calculated from the weight average molecular weight/number average molecular weight (Mw/Mn).

In order to prepare electrode slurry (solid 100 parts by weight), the carbon nanotube dispersion liquid prepared above was mixed with 97.3 parts by weight of a ternary positive electrode active material and 1.5 parts by weight of a PVdF-based binder. Herein, the carbon nanotubes and the partially hydrogenated nitrile rubber were present in 1 part by weight and 0.2 parts by weight, respectively. Subsequently, the electrode slurry was coated on an aluminum current collector, and the result was rolled using a roll press to prepare a positive electrode polar plate (mix density 3.3 g/cc).

Meanwhile, negative electrode slurry comprising 97.3 parts by weight of a negative electrode active material, 0.7 parts by weight of a conductor, 1 part by weight of a viscosity agent (CMC) and 1 part by weight of a binder (SBR) was coated on a copper current collector, and the result was rolled to prepare a negative electrode polar plate having mix density of 1.6 g/cc.

A monocell was manufactured using the positive electrode and the negative electrode using the dispersion liquid prepared above. Specifically, a polyethylene separator was placed between the negative electrode polar plate and the positive electrode polar plate, the result was introduced to a battery case, and then a liquid electrolyte was injected thereto to manufacture a battery. Herein, as the liquid electrolyte, a 1.0 M $LiPF_6$-dissolved mixed solution of ethylene carbonate, ethylmethyl carbonate and diethyl carbonate (1/2/1 volume ratio) was used.

Adhesive Strength Measurement

In order to measure adhesive strength, the positive electrode polar plate (prior to manufacturing a battery) prepared as above was cut to pieces having a same size of 15 mm×150 mm, the pieces were fixed on a slide glass, and peeled off from a current collector to measure 180 degree peel strength. As for the evaluation, peel strength of 5 or more was measured, and the average value was determined. Results of measuring adhesive strength are shown in the following Table 3.

Monocell Evaluation

The battery manufactured above went through 1.0 C/1.0 C charge and discharge for 3 times at room temperature, and SOC was established based on the last discharge capacity. 10 second resistance was measured by applying discharge pulse with 6.5 C at SOC 50.

TABLE 1

|  | Partially Hydrogenated Nitrile Rubber Constituent Unit (wt %) | | | | Partially Hydrogenated Nitrile Rubber Properties | | |
|---|---|---|---|---|---|---|---|
|  | HBD (Chemical Formula 3) | BD (Chemical Formula 2) | AN (Chemical Formula 1) | BA (Butyl Acrylate) | RDB (%) | MW (× 1,000 g/mol) | PDI (Mw/Mn) |
| Example 1 | 54.8 | 11.6 | 33.6 | 0 | 17 | 290 | 4.5 |
| Example 2 | 47.8 | 4.1 | 22.4 | 25.7 | 8 | 510 | 5.6 |
| Example 3 | 53.9 | 3.1 | 43 | 0 | 5 | 222 | 2.5 |
| Example 4 | 43.3 | 22.8 | 33.9 | 0 | 34 | 330 | 4.3 |
| Example 5 | 65.3 | 0.7 | 34.0 | 0 | 1 | 130 | 2.2 |
| Example 6 | 43.9 | 0.3 | 20.9 | 34.9 | 1 | 125 | 2.0 |
| Example 7 | 54.0 | 9.0 | 37.0 | 0 | 14 | 260 | 2.9 |
| Example 8 | 43.9 | 0.3 | 20.9 | 34.9 | 1 | 590 | 6.0 |
| Comparative Example 1 | Not Used | | | | — | — | — |
| Comparative Example 2 | Used Dispersant AFCONA 4570 | | | | — | — | — |
| Comparative Example 3 | 0 | 64.8 | 35.2 | 0 | 100 | 255 | 4.0 |
| Comparative Example 4 | 28.5 | 37.4 | 34.1 | 0 | 57 | 304 | 57.0 |
| Comparative Example 5 | 54.8 | 11.6 | 33.6 | 0 | 17 | 296 | 17.0 |
| Comparative Example 6 | 54.8 | 11.6 | 33.6 | 0 | 17 | 296 | 17.0 |
| Comparative Example 7 | 54.8 | 11.6 | 33.6 | 0 | 17 | 296 | 17.0 |

TABLE 2

|  | CNT Type | Dispersion Composition (wt %) | | |
|---|---|---|---|---|
|  |  | CNT | Partially Hydrogenated Nitrile Rubber | Dispersion Medium (NMP) |
| Example 1 | Entangled-type | 5 | 1 | 94 |
| Example 2 | Entangled-type | 5 | 1 | 94 |
| Example 3 | Entangled-type | 5 | 1 | 94 |
| Example 4 | Entangled-type | 5 | 1 | 94 |
| Example 5 | Entangled-type | 5 | 1 | 94 |
| Example 6 | Entangled-type | 5 | 1 | 94 |
| Example 7 | Entangled-type | 5 | 1 | 94 |

TABLE 2-continued

|  | CNT Type | Dispersion Composition (wt %) | | |
|---|---|---|---|---|
|  |  | CNT | Partially Hydrogenated Nitrile Rubber | Dispersion Medium (NMP) |
| Example 8 | Entangled-type | 5 | 1 | 94 |
| Comparative Example 1 | Entangled-type | 5 | 0 | 95 |
| Comparative Example 2 | Entangled-type | 5 | 1 | 94 |
| Comparative Example 3 | Entangled-type | 5 | 1 | 94 |
| Comparative Example 4 | Entangled-type | 5 | 1 | 94 |
| Comparative Example 5 | Bundle-type | 5 | 1 | 94 |
| Comparative Example 6 | Bundle-type | 2 | 0.4 | 97.6 |
| Comparative Example 7 | Entangled-type | 5 | 1 | 94 |

TABLE 3

|  | Dispersion Liquid Property | | | | | | Battery Performance (DC-IR (ohm)) 6.5 C., 25° C. Discharge |
|---|---|---|---|---|---|---|---|
|  | Dispersed Particle Diameter (µm) | | | Viscosity (@1.2/s) | Dispersion Efficiency | Electrode Adhesion |  |
|  | D10 | D50 | D90 | Pa·s | kWh/kg | gf/cm | SOC 50 |
| Example 1 | 1.12 | 4.28 | 9.47 | 45.0 | 43.5 | 30 | 1.232 |
| Example 2 | 1.24 | 4.44 | 9.74 | 51.0 | 71.8 | 27 | 1.201 |
| Example 3 | 1.20 | 4.38 | 9.65 | 39.0 | 42.3 | 26 | 1.247 |
| Example 4 | 0.92 | 3.58 | 7.87 | 48.0 | 54.5 | 31 | 1.262 |
| Example 5 | 1.17 | 4.39 | 9.60 | 15.0 | 35.2 | 26 | 1.235 |
| Example 6 | 1.14 | 3.73 | 8.41 | 30.0 | 40.5 | 25 | 1.228 |
| Example 7 | 1.06 | 4.08 | 9.15 | 34.0 | 37.8 | 31 | 1.236 |
| Example 8 | 1.20 | 4.54 | 9.70 | 68.0 | 79.0 | 30 | 1.211 |
| Comparative Example 1 | Unable to Secure CNT Wetting (Dispersion Liquid was not prepared) | | | | | | |
| Comparative Example 2 | Unable to Secure CNT Wetting (Dispersion Liquid was not prepared) | | | | | | |
| Comparative Example 3 | Unable to Secure CNT Wetting (Dispersion Liquid was not prepared) | | | | | | |
| Comparative Example 4 | Unable to Secure CNT Wetting (Dispersion Liquid was not prepared) | | | | | | |
| Comparative Example 5 | Unable to Secure CNT Wetting (Dispersion Liquid was not prepared) | | | | | | |
| Comparative Example 6 | 1.15 | 2.35 | 4.98 | 52.0 | — | 12 | 1.364 |
| Comparative Example 7 | 2.30 | 7.06 | 14.60 | 92.0 | — | 6 | Unable to Measure |

Dispersion efficiency at Table 3 is a value representing energy of a beads mill required for particle size distribution $D_{50}$ of the dispersion liquid to reach 5 µm, and a smaller value means having more favorable dispersion efficiency.

Hereinbefore, preferred examples of the present disclosure have been described, however, the scope of a right of the present disclosure is not limited thereto, and various modified and improved forms made by those skilled in the art using the basic concept of the present disclosure defined in the attached claims also belong to the scope of a right of the present disclosure.

The invention claimed is:

1. A carbon nanotube dispersion liquid comprising:
   entangled-type carbon nanotubes;
   a dispersion medium; and
   partially hydrogenated nitrile rubber having a residual double bond (RDB) value of 0.5% by weight to 40% by weight calculated according to the following Mathematical Formula 1,
   wherein dispersed particle diameters of the carbon nanotubes have particle size distribution $D_{50}$ of 2 µm to 5 µm:

RDB (% by weight)=BD weight/(BD weight+HBD weight)×100     [Mathematical Formula 1]

in Mathematical Formula 1, BD is defined as a conjugated diene-derived structure unit and HBD is defined as a hydrogenated conjugated diene-derived structure unit.

2. The carbon nanotube dispersion liquid of claim 1, wherein the partially hydrogenated nitrile rubber comprises an α,β-unsaturated nitrile-derived structure unit, a conjugated diene-derived structure unit and a hydrogenated conjugated diene-derived structure unit.

3. The carbon nanotube dispersion liquid of claim 2, comprising the α,β-unsaturated nitrile-derived structure unit in 20% by weight to 50% by weight with respect to a total weight of the rubber.

4. The carbon nanotube dispersion liquid of claim 1, comprising a carbon nanotube complex in which the partially hydrogenated nitrile rubber is introduced to surfaces of the carbon nanotubes.

5. The carbon nanotube dispersion liquid of claim 1, wherein the dispersed particle diameters of the entangled-type carbon nanotubes have a particle size distribution such that $D_{50}$ is from 2 μm to 5 μm, $D_{10}$ is from 0.5 μm to 1.5 μm and $D_{90}$ is from 6 μm to 10 μm.

6. The carbon nanotube dispersion liquid of claim 1, wherein the partially hydrogenated nitrile rubber comprises a unit of the following Chemical Formula 1, a unit of the following Chemical Formula 2 and a unit of the following Chemical Formula 3:

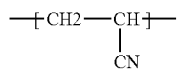

[Chemical Formula 1]

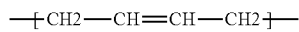

[Chemical Formula 2]

-continued

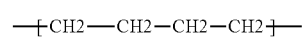

[Chemical Formula 3]

7. The carbon nanotube dispersion liquid of claim 1, wherein the partially hydrogenated nitrile rubber has a weight average molecular weight of 10,000 g/mol to 700,000 g/mol.

8. The carbon nanotube dispersion liquid of claim 1, wherein the partially hydrogenated nitrile rubber has a polydispersity index PDI (Mw/Mn) ratio of 2 to 6.

9. A method for preparing the carbon nanotube dispersion liquid of claim 1, comprising mixing the entangled-type carbon nanotubes, the dispersion medium and the partially hydrogenated nitrile rubber.

10. A method for preparing an electrode slurry comprising mixing the carbon nanotube dispersion liquid of claim 1, an electrode active material and a binder resin.

11. A method for preparing an electrode comprising:
preparing an electrode slurry by mixing the carbon nanotube dispersion liquid of claim 1, an electrode active material and a binder resin; and
forming an electrode using the electrode slurry.

* * * * *